United States Patent [19]

Brown

[11] Patent Number: 4,744,148

[45] Date of Patent: May 17, 1988

[54] CIRCULAR CUTTER BLADE WITH CHAIN SAW EDGE

[76] Inventor: Kermit E. Brown, MPI 14R Orchard La., Underwood, Wash. 98651

[21] Appl. No.: 938,072

[22] Filed: Dec. 4, 1986

[51] Int. Cl.⁴ .............................................. B26B 7/00
[52] U.S. Cl. ...................................... 30/276; 30/347; 83/839
[58] Field of Search ................ 30/276, 347, 381, 388, 30/312, 317, 337, DIG 5, 307; 83/839–845

[56] References Cited

U.S. PATENT DOCUMENTS

| | | | |
|---|---|---|---|
| 2,958,348 | 11/1960 | Bueneman | 143/139 |
| 3,128,550 | 4/1964 | Migelli | 30/347 X |
| 3,425,467 | 2/1969 | Willis | 144/218 |
| 3,781,991 | 1/1974 | Stretton et al. | 30/347 X |
| 4,257,302 | 3/1981 | Heimbrand | 83/839 |
| 4,563,929 | 1/1986 | Ringlee | 83/840 |
| 4,627,322 | 12/1986 | Hayhurst | 83/839 |

Primary Examiner—Douglas D. Watts
Attorney, Agent, or Firm—Eugene M. Eckelman

[57] ABSTRACT

A pair of equal diameter circular plates with a free peripheral edge have aligned apertures for mounting them on the threaded end of an arbor. A chain saw chain rests on the peripheral edge of the plates and tang portions thereof which project between the plates secure the saw chain securely in place when the two plates are clamped together by a nut on the threaded end of the arbor. The blade of the invention which is formed thereby may be used in any application requiring a circular cutter blade and finds particular usefulness as a blade for hand held brush cutters.

1 Claim, 1 Drawing Sheet

CIRCULAR CUTTER BLADE WITH CHAIN SAW EDGE

BACKGROUND OF THE INVENTION

This invention relates to new and useful improvements in cutter blades and in particular relates to a circular cutter blade with a chain saw cutting edge.

Cutter blades have heretofore been provided which utilize a chain saw cutting edge. Such prior saws, however, are considered to have inherent disadvantages in the complexity thereof and/or structure which makes them time consuming to attach to and detach from the saw unit. For example, U.S. Pat. No. 2,958,348 shows a circular saw of the general type described but this blade has the disadvantage that the saw chain is mounted in a groove cut in the peripheral edge of the blade. Such a structure requires expensive cutting of the groove and also requires cross pins to hold the chain in place. U.S. Pat. No. 4,563,929 also shows a circular cutter blade and has the disadvantage that the plurality of segments which are used to make up the peripheral chain comprise an expensive structure both in the manufacture and in installation. U.S. Pat. No. 3,425,467 shows an expensive router blade having multiple chains to obtain a width of cut.

SUMMARY OF THE INVENTION

According to the present invention and forming a primary objective thereof, a circular cutter blade is provided which has a chain saw cutting edge and which is extremely simplified in structure and also simplified in its attachment to and detachment from the cutter blade.

Another important object of the invention is to provide a circular cutter blade of the type described which, although particularly useful as a brush cutter or the like, can be applied to substantially any type of tool which uses a circular cutter blade.

In carrying out the objects of the invention, there is provided a pair of equal diameter circular plates having tooth free, smooth peripheral edges. These plates have aligned arbor connecting apertures therein arranged for securing them in tight abutting relation with each other by an arbor supported nut or the like. A chain saw chain is mounted on the periphery of the two blades with the edges of the cutter links of the chain and connecting links resting on the peripheral edges and with the tang portions of connecting links extending radially inwardly between the plates and clamped securely therebetween by the clamping force of the arbor nut. The chain is connected in an endless structure by connecting links.

The invention will be better understood and additional objects and advantages will become apparent from the following description taken in connection with the accompanying drawings.

DETAILED DESCRIPTION OF A PREFERRED EMBODIMENT

Figure 1:
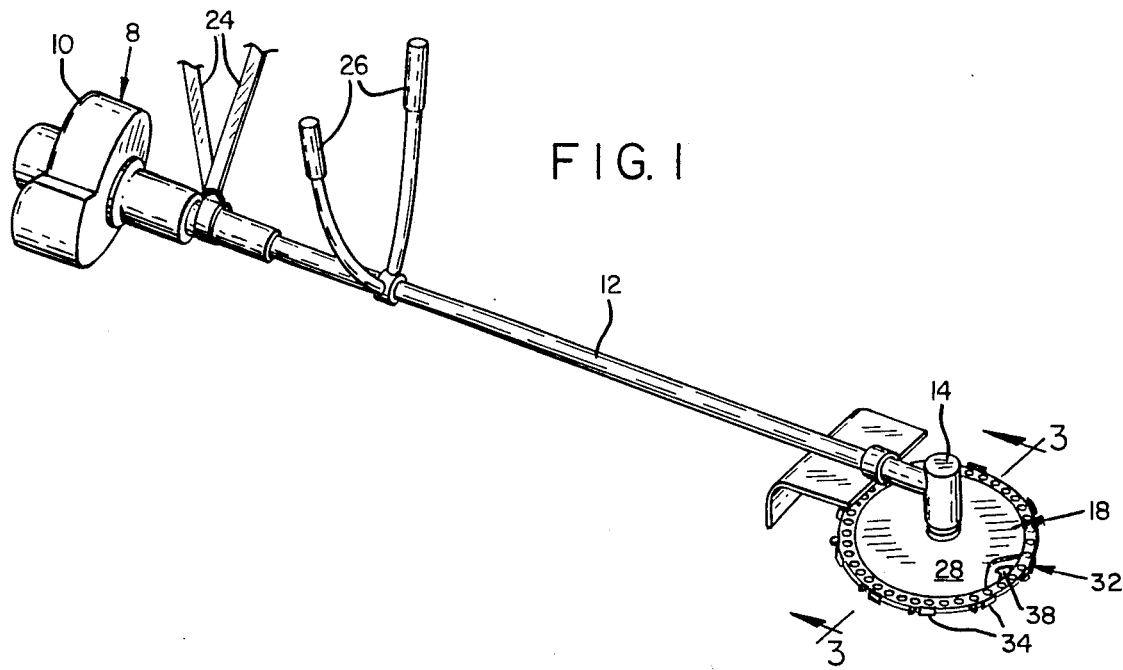
FIG. 1 is a perspective view of a brush cutting tool to which the present cutter blade has particular adaptation.
Figure 2:
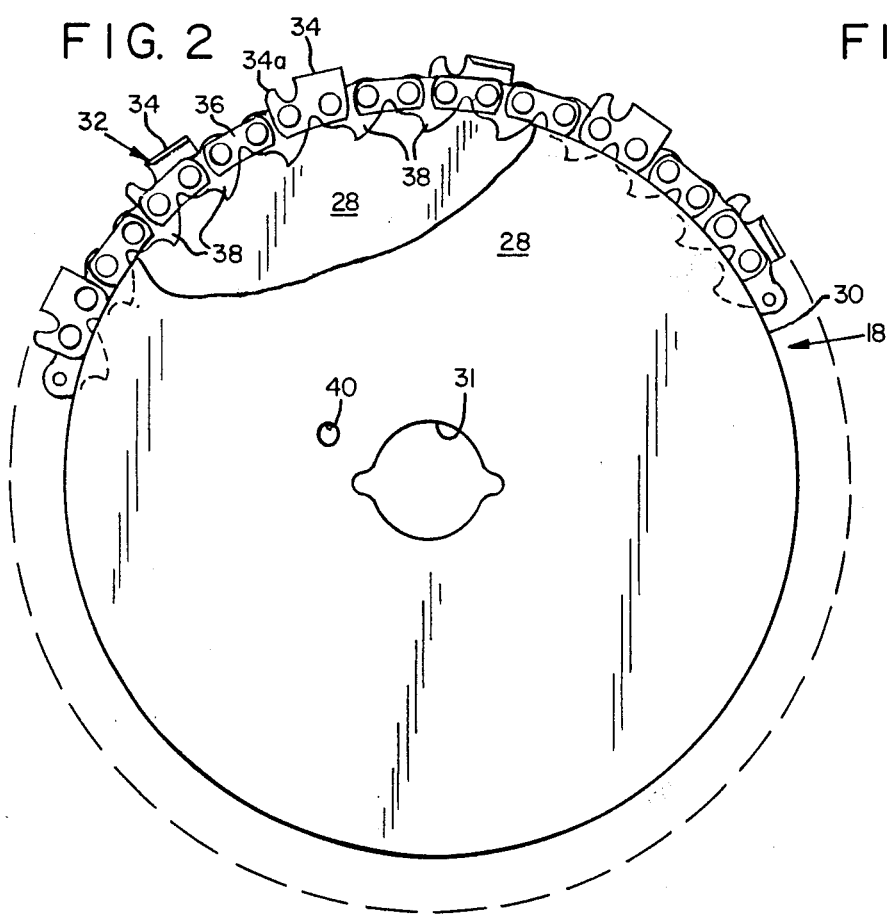
FIG. 2 an enlarged face view of the cutter blade; this view being partly broken away.
Figure 3:
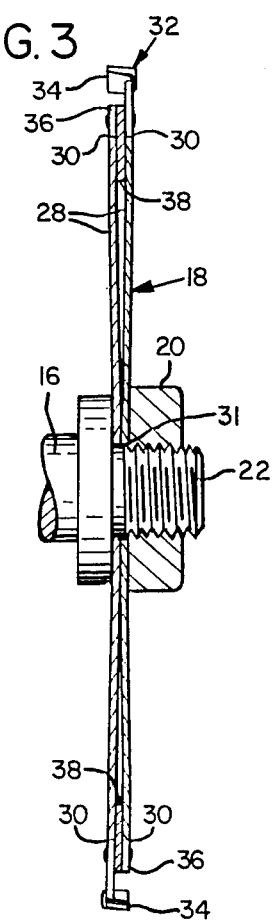
FIG. 3 is a central sectional view taken on the line 3—3 of FIG. 1.

With particular reference to FIG. 1, which shows a conventional brush cutting tool 8, the numeral 10 designates the power unit of the tool. This power unit has elongated internal drive shaft means 12 terminating at the bottom in a gear box 14 with an output arbor or shaft 16, FIG. 3, to which a blade 18 of the invention can be secured as by a nut 20 on a threaded end 22 of the arbor. The brush cutting tool also employs harness means 24 and operator manipulating handles 26.

The blade 18 of the invention comprises a pair of equal diameter plates 28 each having a smooth peripheral edge 30 and also each being provided with an arbor receiving aperture 31 whereby to clamp the two plates together securely on the arbor 16 by the nut 20. The two plates 28 are independent from each other whereby when removed from the arbor they separate.

The cutting edge of the blade comprises a conventional chain saw chain 32 having L-shaped cutter links 34 with depth gauges 34a and tie straps or connecting links 36. As in the usual case, centrally located ones of the tie straps 36 have tang portions 38 which project inwardly. For the purpose of mounting the cutter chain in place on the plates 28, it is placed on the smooth outer edge of the plates with side tie straps 36 and cutter links resting on the smooth peripheral edges and the tang portions 38 extending down between the plates. As in the usual case with a saw chain, the free ends of the chain are connected together by removable side links 36.

When the assembly is mounted on the arbor, the arbor nut 20 draws the plates together in warping relation and securely clamps outer sprung portions thereof against the tangs of the chain. This holds the chain securely in place. When the arbor nut is unthreaded, the plates will separate and the chain readily removed from the blade and arbor for sharpening or replacement. If desired, the plates may have aligned apertures 40 arranged to receive a bolt which can be applied prior to removing the arbor nut in the event that it is desired to remove the blade fully intact, such as when sharpening is to be accomplished with the chain on the blade.

In operation, the present cutter blade cuts much better than a conventional saw blade, at least in its use as a brush cutter. The chain saw cutting edge prevents binding, it can be readily sharpened and renewed, and it amounts to an inexpensive assembly particularly since the plates 28 can be readily stamped with their smooth edge, round form and do not require grooves. Also, the chain comprises a conventional saw chain.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A portable cutting tool arranged to be carried by a person comprising:
   a frame portion,
   a power unit on said frame portion,
   depending shaft means extending from said power unit and having a threaded botton end,
   a pair of equal diameter separate circular blades having a flat configuration with a tooth-free peripheral edge, aligned shaft connecting apertures in said plates arranged for securing said plates in tight abutting concentric relation with each other by nut means threadedly secured to said threaded bottom end, a chain saw chain on the periphery of said plates of the type having cutter links and connecting links with tang portions projecting oppositely from said cutter links, said chain being mounted on said peripheral edges with said cutter links and connecting links resting on said peripheral edges and with said tang portions of said connecting links extending radially inwardly between said plates, said tang portions being clamped frictionally between said plates by the force of said shaft supported nut means against said plates, said plates being sprung outwardly toward their periphery by the thickness of said tang portions when said nut means is clamped tightly against said plates such that said frictional clamping engagement with said tang portions connects said chain to said plates for rotation therewith, and second aligned aperture means in said plates offset from center and arranged to receive a bolt for holding said plates together when removed from said shaft means.

* * * * *